United States Patent [19]

Mainiero

[11] Patent Number: 5,072,980
[45] Date of Patent: Dec. 17, 1991

[54] HELICAL BARBED TAPE RECOVERY TOOL

[75] Inventor: John W. Mainiero, Sandy Hook, Conn.

[73] Assignee: MRM Security Systems, Inc., Waterbury, Conn.

[21] Appl. No.: 570,028

[22] Filed: Aug. 20, 1990

[51] Int. Cl.$^5$ .............................................. B65G 7/12
[52] U.S. Cl. ...................................... 294/15; 294/131; 294/158
[58] Field of Search .................... 294/15, 26, 131, 137, 294/158, 19.1

[56] References Cited

U.S. PATENT DOCUMENTS

| 151,295 | 5/1874 | Knight | 294/131 X |
|---|---|---|---|
| 1,484,495 | 2/1924 | Hatherley | 294/26 |
| 3,006,678 | 10/1961 | Johnson | 294/26 |
| 3,474,833 | 10/1969 | Garrette, Jr. et al. | 294/19.1 X |
| 4,240,658 | 12/1980 | Britson | 294/19.1 |
| 4,503,423 | 3/1985 | Mainiero et al. | 256/8 X |

Primary Examiner—Margaret A. Focarino
Assistant Examiner—Dean J. Kramer
Attorney, Agent, or Firm—Anthony J. Casella; Gerald E. Hespos

[57] ABSTRACT

A hand tool is disclosed for rapidly recovering an extensible and retractable antipersonnel barrier of helical barbed tape. The hand tool includes first and second elongated parallel gripping arms joined at one end by a base section. Each of the elongated gripping arms includes an L-shaped rigid safety barrier defined by a forward guard rail and an elongated lateral guard rail. The distal end of each of the elongated lateral guard rails is disposed intermediate the base section such that the lateral guard rails are parallel to the elongated gripping arms. The distal end of each of the forward guard rails are disposed at the distal end of each of the elongated gripping arms respectively, thereby defining a pair of generally rectangular zones of safety. The hand tool further includes a telescoping engaging arm which comprises a fixed outer tube and a removable elongated inner tube. The inner tube is connected to the fixed outer tube by a bayonet-type locking mechanism. During a rapid recovery operation the rigid safety barriers preclude the razor sharp barb clusters on the helical barbed tape barrier from coming into contact with the hands of the user, thereby preventing severe injuries. The inner tube of the telescoping engaging arm can be easily removed so as to facilitate convenient storage of the tool in a desired container.

7 Claims, 2 Drawing Sheets

HELICAL BARBED TAPE RECOVERY TOOL

BACKGROUND OF THE INVENTION

The invention relates to a hand tool used to rapidly recover an extensible and retractable barrier of helical barbed tape.

Helical barbed tape is widely used as an elongated antipersonnel barrier that may be staked to the ground to define a perimeter, installed at the base of a fence, or mounted on the top of a fence or a rooftop. Helical barbed tape is disclosed in U.S. Pat. No. 3,463,455 which issued to Meckel on Aug. 26, 1969, and is entitled "HELICAL BARBED TAPE UNITS". The helical barbed tape that is illustrated in U.S. Pat. No. 3,463,455 is defined by an elongated generally flat central support having clusters of barbs at spaced apart locations. Each cluster of barbs typically will comprise a first pair of barbs extending from a root on the radially outer side of the tape and a second pair of barbs extending from the root on the radially inner side of the tape. Each barb is a generally elongated planar structure having two generally opposed edges converging toward one another and meeting at a very sharp point. The barbs in each pair lie in a common plane, but extend in generally opposite directions relative to one another. Furthermore, each pair of barbs is offset relative to the plane of the central supporting portion of the tape such that one barb in each pair extends angularly away from one surface of the central support while the other barb in that pair extends away from the opposite surface of the central support. To achieve optimum effectiveness, the first and second pairs of barbs are offset in opposite angular directions. The metal stock that the tape is formed from must have a sufficient thickness to insure that each barb will be rigid enough to slash into an intruder.

The above described tape has a broad range of applications, all of which relate to security. For example, in a military application, one or more strands of helical barbed tape will be stretched along the ground to define a perimeter. In many applications, it is desirable to rapidly deploy the helical barbed tape barrier to meet a particular exigency. A rapid deployment antipersonnel barrier of this type is disclosed in U.S. Pat. No. 4,503,423 which issued to Mainiero et al., on Mar. 5, 1985, entitled "EXTENSIBLE AND RETRACTABLE BARRIER AND ELECTROMAGNETIC DETECTOR THEREFOR". The barrier coil depicted in U.S Pat. No. 4,503,423 is particularly suited to be deployed along a desired barrier trace with a predetermined maximum length and minimum diameter for rapid interference-free deployment and subsequent collapsing of the barrier coil into its original condition for redeployment. A helical barbed tape barrier of this type is deployed such that a person attempting to pass therethrough will contact one or more of the closely spaced barbs on the tape, which are formed with sufficient sharpness to inflict a severe wound. This initial contact with the tape will also cause wavelike movements elsewhere on the helical tape causing other barbed clusters to be urged into the intruder.

To provide a barrier, as in U.S. Pat. No. 4,503,423, which can be rapidly recovered for repeated use and which is particularly suited for rapid deployment under emergency conditions and thereafter retractable for re-use, it is necessary to further provide a rapid recovery tool. Heretofore, a prior known rapid recovery tool consisted of an elongated metal tube which was bent into a U-shape to define a base and two generally symmetrical elongated gripping arms. The prior art tool also included an elongated engaging arm extending outwardly from, and welded to, the base in the same plane as, and parallel to, the elongated gripping arms. The prior art tool was employed by inserting the elongated engaging arm into the end coil of extended helical barbed tape at a desired location on its periphery, and thereafter the elongated gripping arms were continuously pulled until the extensible and retractable barrier was fully recovered.

During a rapid recovery operation the helical barbed tape could come within close proximity to the elongated gripping arms, whereby the hardened razor sharp barb clusters on the tape could make contact with the hands of the user and inflict severe wounds thereupon. Although it was common practice to use gloves when recovering a barrier of helical barbed tape, the barbs are sufficiently sharp to penetrate through most gloves.

As disclosed in U.S. Pat. No. 4,503,423, the retractable and extensible barrier can be collapsed into a compact condition and stored in a desired enclosure. However, the size of the prior known recovery tool, in particular, the length of the elongated engaging arm, precluded it form being conveniently stored in the same enclosure as the collapsed barrier.

Accordingly, it is an object of the subject invention to provide a tool for rapidly recovering an extensible and retractable helical barbed tape barrier in a manner that will protect the limbs of those who use the tool from severe injuries caused by contact with the razor sharp barbs.

It is an additional object of the subject invention to provide a recovery tool that is able to be conveniently stored in the same enclosure as a collapsed retractable and extensible barrier of helical barbed tape.

SUMMARY OF THE INVENTION

The subject invention is directed to a new and improved tool for rapidly recovering an extensible and retractable antipersonnel barrier of helical barbed tape. The tool of the subject invention includes two safety guard rails particularly suited to prevent the razor sharp barbs on the helical barbed tape from inflicting injuries upon the users, and an outwardly extending telescoping engaging arm which can be separated from the main tool structure to enable convenient storage of the tool prior to or following its employment.

The new and improved recovery tool comprises several elongated tubes of metal which have been welded together at angles of 90° to one another, in the same plane, to define a base and two generally symmetrical elongated gripping arms. The recovery tool includes two rigid safety barriers, each comprising an elongated strip of metal having a major surface face width dimension greater than its thickness, which is bent into an L-shape along an axis orthogonal to its longitudinal axis, to define an elongated lateral guard rail and a shorter forward guard rail. The distal end of the forward guard rail is disposed on the distal end of an elongated gripping arm, at an angle of 90°, in the same plane as both of the elongated gripping arms, such that the elongated lateral guard rail is parallel to the gripping arm. The distal end of the lateral guard rail is disposed intermediate, and on the periphery of, the base section of the tool, whereby a generally rectangular zone of safety is created. A zone of safety is defined by the parallel lateral guard rail and elongated gripping arm and the parallel forward guard rail and base section.

The tool of the subject invention further includes an outwardly extending telescoping engaging arm comprising two concentric metal tubes, the removable inner tube having an outer diameter slightly less than the inner diameter of the fixed outer tube. The fixed outer tube is disposed on the periphery of the base of the tool at an angle of 180°, equidistant from both of the gripping arms, and parallel to the same. The non-engaging distal end of the fixed outer tube protrudes slightly from the base of the tool, and the elongated engaging portion of the fixed outer tube extends outwardly from the base in an alternate plane then, but parallel to the elongated gripping arms.

The inner tube of the elongated telescoping engaging arm is connected to the fixed outer tube of the same by a spring loaded bayonet-type locking mechanism. The locking mechanism comprises a spring of a desired constant force, a roll pin to retard the spring during compression, and a J-shaped channel, disposed within the distal end of the inner tube of the telescoping engaging arm. The locking mechanism further comprises a cap screw disposed intermediate the outer tube of the telescoping engaging arm.

The subject recovery tool is employed by first inserting the inner tube of the telescoping engaging arm into the outer tube of the same, and thereafter rotating the inner tube through an angle sufficient to engage the bayonet-type locking mechanism disposed within the inner tube. There are alternative means of connection that may be provided. For example, the locking mechanism could be a spring loaded detent disposed in the inner tube, or the inner tube and the outer tube could be threaded so as to enable a screw type connection. Secondly, the telescoping engaging arm is inserted in an extensible and retractable helical barbed tape barrier at a desired location on its periphery, thereafter a continuous and sufficient lateral force is applied upon the gripping arms so as to fully collapse and recover the barrier.

During a recovery operation the rigid safety barriers preclude the razor sharp barbs on the tape barrier from penetrating into the defined zones of safety, thereby preventing any severe lacerating of the users' hands.

At the completion of a recovery operation the inner tube of the telescoping engaging arm may be unlocked, whereby the tool and the separated inner tube may be conveniently stored in the same enclosure that is provided for storing the collapsed barrier.

DETAILED DESCRIPTION OF THE PREFERRED EMBODIMENT

Figure 1:
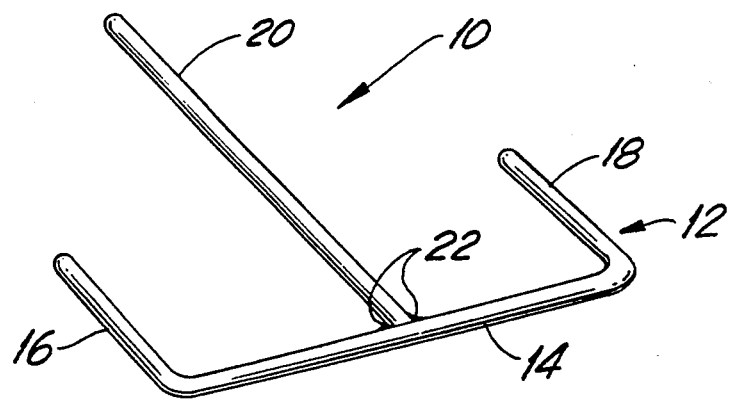
FIG. 1 is a top plan view of a prior art recovery tool.

A prior art recovery tool is illustrated in FIG. 1 and is designated generally by reference numeral 10. The prior art tool 10 was integrally formed from an elongated metal tube 12 that was bent into a U-shape to define a base section 14, and two generally symmetrical elongated gripping arms 16 and 18. The prior art tool 10 included an outwardly extending engaging arm 20 rigidly connected to the base section 14 by weldments 22. In operation the outwardly extending engaging arm 20 was inserted into an extensible and retractable helical barbed tape barrier. Thereafter, an upward lifting force was applied upon the gripping arms 16 and 18 of the prior art tool 10 so as to raise the engaged portion of the barrier off of the ground. A continuous axial force was then applied upon the gripping arms 16 and 18, whereby the barrier of helical barbed tape was collapsed into a compact condition and stored in a desired container. During a rapid recovery operation, the razor sharp barbs on the helical barbed tape barrier could come dangerously close to the elongated gripping arms 16 and 18 of the prior art tool 10, thereby compromising the safety of the users.

Figure 2:
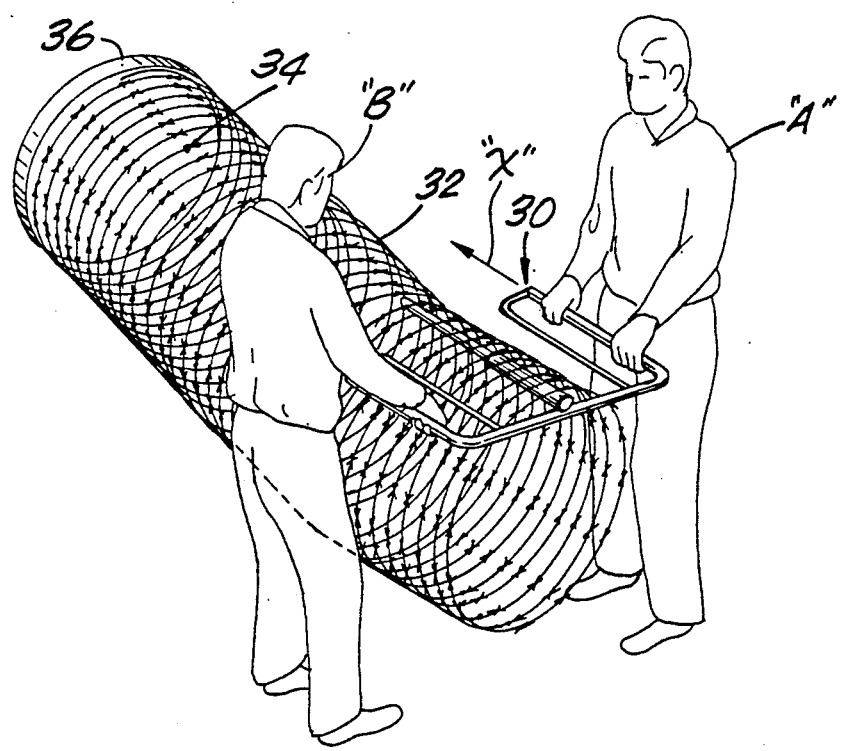
FIG. 2 is a perspective view of the tool of the subject invention being employed for the recovery of a barrier coil.

The rapid barrier recovery tool of the subject invention is illustrated in FIG. 2 and is designated generally by reference numeral 30. In particular, the tool 30, as shown in FIG. 2 is employed by the workers "A" and "B" with the extensible and retractable helical barbed tape barrier 32, having razor sharp barb clusters 34 spaced about its circumference. The tool 30 is intended to rapidly collapse the coil barrier 32, into the storage container 36, and thereafter the tool 30 can be stored in container 36, along with the collapsed coil barrier 32.

Figure 3:
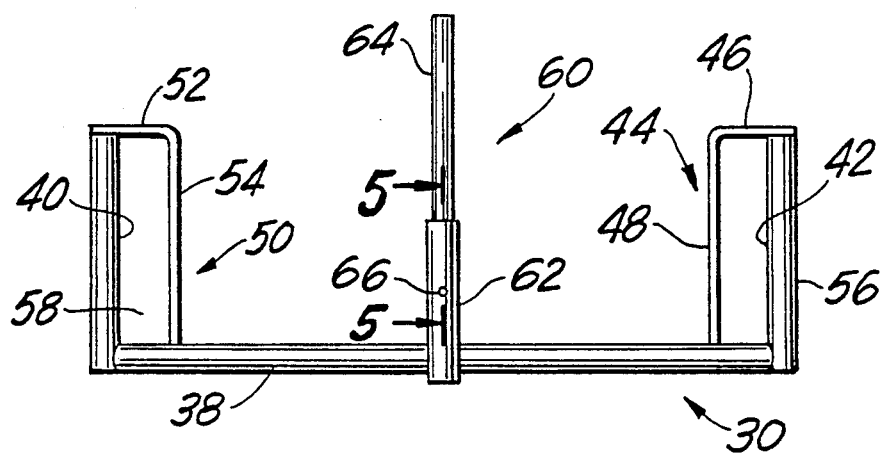
FIG. 3 is a top plan view of the tool of the subject invention, with the telescoping engaging arm fully extended.
Figure 4:
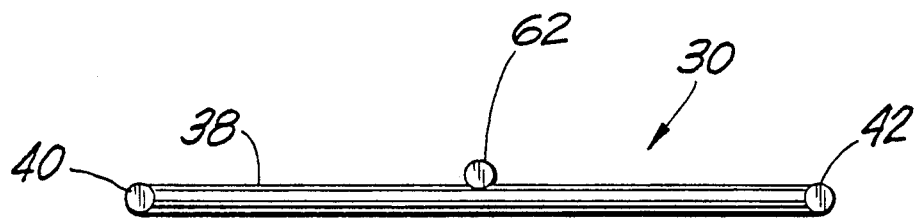
FIG. 4 is an end view of the tool of the subject invention tool base.

The details of construction of the rapid barrier recovery tool 30 of the subject invention are illustrated in FIGS. 3 and 4. The tool 30, formed of metal tubing, comprises two generally symmetrical gripping arm 40 and 42, each disposed on the distal end of the base section 38, such that the arms 40 and 42, and the base section 38 form a generally U-shaped structure.

The tool 30 includes two rigid safety barriers 44 and 50, each comprising an elongated strip of metal bent into an L-shape along an axis orthogonal to its longitudinal axis, to define forward guard rails 46 and 52 respectively and elongated lateral guard rails 48 and 54 respectively. The distal end of each of the forward guard rails 46 and 52 of the safety barriers 44 and 50 are disposed on the distal end of the elongated gripping arms 40 and 42 respectively. The distal end of each of the lateral guard rails 48 and 54 are disposed intermediate the base section 38, such that the L-shaped safety barriers 44 and 50 and the elongated gripping arms 40 and 42 lie in the same plane.

The tool 30 further includes a telescoping engaging arm 60, comprising a fixed outer tube 62 and a removable inner tube 64. The fixed outer tube 62 is disposed on the periphery of the base section 38, at a point between, and equidistant from, the generally symmetrical elongated gripping arms 40 and 42.

Figure 5:
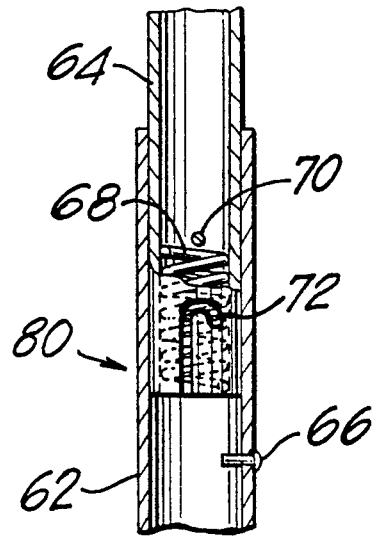
FIG. 5 is a partial cross-sectional view taken along line 5—5 in FIG. 4, and illustrating details of the spring loaded bayonettype locking mechanism for the telescoping engaging arm.

The telescoping engaging arm 60 of the recovery tool 30 includes a bayonet-type locking mechanism illustrated in FIG. 5, and is designated generally by reference numeral 80. The bayonet locking system comprises a cap screw 66, which is disposed intermediate the fixed outer tube 62 of the telescoping engaging arm 60, a coiled spring 68 and a roll pin 70 disposed within the inner tube 64 of the telescoping engaging arm 60. The bayonet locking system further comprises a generally J-shaped engaging channel 72 disposed in the distal end of the inner tube 64 of the telescoping engaging arm 60.

In operation, the removable inner tube 64 of the telescoping engaging arm 60 is inserted into the fixed outer tube 62. Thereafter, the inner tube 64 is rotated through a sufficient radial angle so as to enable the cap screw 66 disposed in the outer tube 62 to engage the J-shaped channel 72 in the inner tube 64. Upon entering the J-shaped channel 72, the cap screw 66 makes contact with the coiled spring 68. The inner tube 64 is thereafter extended further into the fixed outer tube 62, thereby compressing the coiled spring 68 against the roll pin 28 until the cap screw 66 is fully engaged in the J-shaped channel 72. Once the cap screw 66 is fully engaged in the J-shaped channel 72 the spring 68 relaxes so as to exert a locking force on the cap screw 66, thereby resulting in a rigid but temporary connection of the inner tube 64 within the outer tube 62 of the telescoping engaging arm 60.

To recover the extensible and retractable barrier coil of helical barbed tape 32 illustrated in FIG. 2, the telescoping engaging arm 60 is inserted into the coil barrier 32, at a desired location on its periphery. An upward lifting force is then applied by the workers "A" and "B" upon the elongated gripping arms 40 and 42 so as to lift the engaged portion of the helical barbed tape barrier 32 above the ground. Thereafter, an axial force is applied by the workers "A" and "B", upon the gripping arms 40 and 42, in a direction along the arrow "x", so as to collapse the barrier coil 32.

During a rapid recovery operation the razor sharp barb clusters 34 on the coil barrier 32 are precluded from entering the generally rectangular safety zones 56 and 58, created by the safety barriers 44 and 50 respectively. Therefore, the hands of the workers "A" and "B" are protected from severe injuries which could have resulted from contact with the sharpened barbs 34 on the coil barrier 32.

Upon completion of a recovery operation the inner tube 64 of the telescoping engaging arm 60 can be disengaged from the bayonet locking mechanism 80 and removed from the fixed outer tube 62 of the telescoping engaging arm 60, so as to enable the entire recovery tool 30 to be conveniently stored in the barrier coil container 36.

In summary, a recovery tool is provided comprising elongated metal tubes welded together in a U-shaped structure, to define a base and two elongated gripping arms. Each of the gripping arms includes a rigid safety barrier that prevents the razor sharp barb clusters on the extensible and retractable antipersonnel barrier of helical barbed tape from making contact the users hands. The tool includes a telescoping engaging arm with a bayonet-type locking mechanism. The inner section of the engaging arm can be easily removed so as to promote convenient storage of the entire tool in a desired enclosure.

While the invention has been described with respect to a preferred embodiment, it is apparent that various changes can be made without departing from the scope of the invention. For example, the locking mechanism in the telescoping engaging arm can comprise a spring loaded detent, or the inner and outer tubes could be connected by screw threads.

We claim:

1. A hand tool for rapidly recovering an extensible and retractable antipersonnel barrier of helical barbed tape, said hand tool being generally U-shaped and comprising first and second outwardly extending generally parallel elongated gripping arms and a base section, said gripping arms including first and second generally L-shaped rigid safety barriers respectively, said first and second rigid safety barriers having elongated lateral guard rails and forward guard rails respectively, the distal ends of said forward guard rails disposed on the distal ends of said gripping arms respectively, the distal ends of said elongated lateral guard rails disposed intermediate said base section, said first and second rigid safety barriers and said first and second elongated gripping arms forming generally rectangular zones of safety respectively therebetween, said hand tool further including an elongated engaging arm disposed on the periphery of, and intermediate said base section, said elongated engaging arm extending outwardly from said base section between said elongated gripping arms, said elongated engaging arm being parallel to said first and second gripping arms, whereby the gripping arms are grasped by the users within said zones of safety, and the engaging arm is inserted into the coil of helical barbed tape and thereafter force is applied to the gripping arms so as to collapse the barrier into a nested condition.

2. A hand tool as in claim 1 wherein said elongated engaging arm is longer than said elongated gripping arms.

3. A hand tool as in claim 1 wherein said elongated engaging arm is telescopic and includes a removable inner section and a fixed outer section so as to facilitate convenient storage in a desired container.

4. A hand tool as in claim 3 wherein said fixed outer section of said telescoping engaging arm is disposed on the periphery of, and intermediate said base section.

5. A hand tool as in claim 3, wherein said inner section of said telescoping engaging arm has a first distal end that is received in the free end of said fixed outer section of said telescoping engaging arm and maintained therein by a locking mechanism, said locking mechanism including an elongated coiled spring mounted within said inner section adjacent said first distal end, the distal end of said inner section having a generally J-shaped slot formed therein and including an elongated entry portion and a curved engaging portion, said elongated entry portion being parallel to the longitudinal axis of said inner section, with said curved engaging portion being spaced from said first distal end, said locking mechanism further including a pin member mounted adjacent said free end of said fixed outer section and extending radially inwardly, whereby said inner section is connected to said fixed outer section when said pin member is received in the entry portion of said J-shaped slot and is thereafter retained in the curved engaging portion of said J-shaped slot by said elongated coiled spring.

6. A hand tool for rapidly recovering an extensible and retractable antipersonnel barrier of helical barbed tape, said hand tool being generally U-shaped and comprising first and second outwardly extending generally parallel elongated gripping arms and a base section, said gripping arms including first and second generally L-shaped rigid safety barriers respectively, said first and second rigid safety barriers having elongated lateral guard rails and forward guard rails respectively, the distal ends of said forward guard rails disposed on the distal ends of said gripping arms respectively, the distal ends of said elongated lateral guard rails disposed intermediate said base portion, said first and second rigid safety barriers and said first and second elongated gripping arms forming generally rectangular zones of safety respectively therebetween, said hand tool further including an elongated telescoping engaging arm, said elongated telescoping engaging arm having a removable inner section with a first distal end and a fixed outer section having a free end, said first distal end of said inner section being received in said free end of said fixed outer section and maintained therein by a locking mechanism including an elongated coiled spring mounted within said inner section adjacent said first distal end, the distal end of said inner section having a generally J-shaped slot formed therein and including an elongated entry portion and a curved engaging portion, said elongated entry portion being parallel to the longitudinal axis of said inner section, with said curved engaging portion being spaced from said first distal end, said locking mechanism further including a pin member mounted adjacent said free end of said fixed outer section and extending radially inwardly, said inner section being connected to said fixed outer section when said pin member is received in the entry portion of said J-shaped slot and is thereafter retained in the curved engaging portion of said J-shaped slot by said elongated coiled spring, said fixed outer section of said telescoping engaging being disposed on the periphery of, and intermediate said base section, said fixed outer section extending outwardly from said base section between said elongated gripping arms, said telescoping engaging arm being parallel to said first and second gripping arms, whereby the gripping arms are grasped by the users within said zones of safety, and the engaging arm is inserted into the coil of helical barbed tape and thereafter force is applied to the gripping arms so as to collapse the barrier into a nested condition,, subsequently the inner section of the telescoping engaging arm is removed so as to facilitate convenient storage of the hand tool in a desired container.

7. A hand tool as in claim 6 wherein said elongated engaging arm is longer than said elongated gripping arms.

* * * * *